United States Patent [19]

Steinbauer et al.

[11] Patent Number: 5,629,397
[45] Date of Patent: May 13, 1997

[54] 2,6-DIMETHYLPHENYLMALEIMIDE AS A COMONOMER FOR STYRENE COPOLYMERS AND VINYL CHLORIDE COPOLYMERS

[75] Inventors: Gerhard Steinbauer, Enns, Austria; Jan Bartus, New York, N.Y.; Heinrich Horacek, Puchenau, Austria; Otto Vogl, New York, N.Y.; Gerhard Stern, Sonnberg, Austria

[73] Assignee: DSM Chemie Linz GmbH, Linz, Austria

[21] Appl. No.: 601,475

[22] Filed: Feb. 14, 1996

Related U.S. Application Data

[63] Continuation of Ser. No. 258,470, Jun. 10, 1994, abandoned.

[30] Foreign Application Priority Data

Jun. 11, 1993 [AT] Austria ................. 1131/93

[51] Int. Cl.⁶ ................ C08F 222/40; C08F 220/10; C08F 236/04; C08F 220/48; C08F 212/08
[52] U.S. Cl. ................ 526/262; 526/347; 526/338; 526/328.5; 526/342
[58] Field of Search ................ 526/262, 338, 526/328.5, 342, 347

[56] References Cited

U.S. PATENT DOCUMENTS

| | | |
|---|---|---|
| 3,639,509 | 2/1972 | Andrascheck et al. . |
| 3,652,726 | 3/1972 | Nield et al. . |
| 3,676,404 | 7/1972 | Nield . |
| 3,766,142 | 10/1973 | Nield et al. . |
| 4,386,176 | 5/1983 | Fukuda et al. . |
| 4,543,392 | 9/1985 | Kasahara et al. . |
| 4,617,358 | 10/1986 | Eichenauer et al. . |
| 4,877,833 | 10/1989 | Kondo et al. ................ 525/64 |

FOREIGN PATENT DOCUMENTS

| | | |
|---|---|---|
| 0222924 | 5/1987 | European Pat. Off. . |
| 0367013 | 5/1990 | European Pat. Off. . |
| 0372336 | 6/1990 | European Pat. Off. . |
| 2644492 | 4/1977 | Germany . |
| 2849424 | 5/1979 | Germany . |
| 2930031 | 2/1981 | Germany . |
| 3922117 | 1/1990 | Germany . |
| 4040995 | 6/1992 | Germany . |
| 871222 | 10/1981 | Russian Federation . |
| 1178327 | 9/1985 | Russian Federation . |
| 1593180 | 11/1992 | Russian Federation . |
| 1088758 | 10/1967 | United Kingdom . |

OTHER PUBLICATIONS

Matsumoto et al., Macromolecules, 25(12), 3323–3324 (1992).
Matsumoto et al., Macromolecules, 23(21), 4508–4513 (1990).
Chem. Abstr. vol. 111, col. 8385k (1989).
Derwent Abstracts: Ref. 90-323706/43 (1990).
Derwent Abstracts: Ref. 87-012610/02 (1987).
Derwent Abstracts: Ref. 86-243451/37 (1986).
Chem. Abstr. vol. 113, col. 153135z (1990).
Chem. Abstr. 98, col, 90254m (1983).
Hochmolekularbericht: Ref. H.2371/84 (1984).
Central Patents Index Ref. 88-186168/27 (1988).

*Primary Examiner*—Joseph L. Schofer
*Assistant Examiner*—Wu C. Cheng
*Attorney, Agent, or Firm*—Wenderoth, Lind & Ponack

[57] ABSTRACT

2,6-dimethylphenylmaleimide is used as a comonomer for the preparation of styrene copolymers and vinyl chloride copolymers having an increased glass transition temperature and low intrinsic coloration compared with the prior art.

5 Claims, No Drawings

2,6-DIMETHYLPHENYLMALEIMIDE AS A COMONOMER FOR STYRENE COPOLYMERS AND VINYL CHLORIDE COPOLYMERS

This application is a continuation of now abandoned application, Ser. No. 08/258,470, filed Jun. 10, 1994.

The invention relates to the use of 2,6-dimethylphenylmaleimide as a comonomer for styrene copolymers and vinyl chloride copolymers, such polymers and their use.

Styrene polymers and vinyl chloride polymers are important representatives within the range of plastics and are already employed in wide fields, for example in the motor vehicle industry and for domestic appliances, containers, floor coverings and many other uses. However, compared with metals, for example, conventional styrene polymers and vinyl chloride polymers as a material have the disadvantage of a lower heat distortion point, which limits their possible uses. For this reason, attempts have been made to improve the heat distortion point of styrene polymers and vinyl chloride polymers. A number of maleimides, such as, for example, phenylmaleimide or bismaleimides, have thus already been copolymerized with styrene (DE-A 28 49 242) or with vinyl chloride, whereby it has been possible to increase the glass transition temperatures of the polymers somewhat compared with styrene copolymers and vinyl chloride copolymers without maleimide. The better results have been achieved here with bismaleimides. The use of 2,6-dimethylphenylmaleimide as a comonomer for the preparation of transparent, colorless polymethacrylates is described in Chemical Abstracts, volume 111: 155054 e.

The object of the present invention was to prepare styrene copolymers and vinyl chloride copolymers which have a significantly improved heat resistance and low intrinsic coloration. It has been possible, unexpectedly, to achieve this object by copolymerization with 2,6-dimethylphenylmaleimide.

The invention accordingly relates to the use of 2,6-dimethylphenylmaleimide as a comonomer for the preparation of styrene copolymers and vinyl chloride copolymers having an increased glass transition temperature and low intrinsic coloration.

Styrene copolymers here are polymers which, in addition to styrene and 2,6-dimethylphenylmaleimide, contain at least 1, preferably 2, other monomers. These monomers are preferably chosen from the groups comprising dienes and acrylates. The diene group comprises, for example, butadiene, isoprene, chloroprene, neoprene or 2,3-dimethyl-1,3-butadiene, and butadiene is preferably chosen. Acrylates are, for example, acrylonitrile, acrylic acid and acrylic acid esters having 1–12 C atoms in the ester part. Acrylonitrile is preferably used. In addition to styrene, styrene derivatives, such as alpha-methylstyrene, vinyl toluenes, such as 2-methylstyrene, 3-methylstyrene or 4-methylstyrene, or chlorostyrenes, such as 2-chlorostyrene, 3-chlorostyrene, 2,4dichlorostyrene and 2,5-dichloro- and 2,6-dichlorostyrene, are also to be understood here. Preferred styrene copolymers are styrene/butadiene polymers (SBR), styrene/acrylonitrile polymers (SAN) and acrylonitrile/butadiene/styrene polymers (ABS). In contrast, vinyl chloride copolymers (PVC) contain only vinyl chloride and 2,6-dimethylphenylmaleimide. The particular monomers of the styrene copolymers (SP) and PVC are copolymerized according to the invention with 2,6-dimethylphenylmaleimide (DMPMI), 1–75% by weight, preferably 5–50% by weight, of DMPMI being added. The customary additives, such as, for example, UV stabilizers, oxidation retardants, antistatics, fillers, colored pigments and reinforcing fibers, furthermore can also be added.

The invention furthermore relates to the styrene copolymers and vinyl chloride polymers modified with 2,6-dimethylphenylmaleimide, and the preparation thereof. Polymerization techniques for the preparation of the polymers modified with DMPMI are bulk, emulsion, solution, precipitation, suspension and latex suspension polymerization.

The emulsion, the suspension and the latex suspension polymerization techniques are preferably used.

The polymerization is preferably carried out in the presence of one or more customary polymerization initiators. Customary polymerization initiators are, for example, peroxides, such as benzoyl peroxide, dicumyl peroxide or di-tert-butyl peroxide, or azo compounds, such as azodiisobutyronitrile, or persulfates, such as potassium persulfate or ammonium persulfate. The initiator is added here in catalytic amounts of 0.1–1 mol %.

The polymerization can possibly also be started by means of heat.

The reaction temperature varies according to the starting compounds and polymerization technique and is about 20°–200° C. If appropriate, the polymerization can also be carried out under an inert gas atmosphere, for example under a nitrogen atmosphere.

If the polymerization is carried out in solution, dioxane, dimethylformamide, dimethylacetamide, N-methylpyrrolidone, tetrahydrofuran, ethylbenzene, xylene or toluene, for example, are used as the solvent.

However, the polymerization reaction can also be carried out in the absence of an additional solvent; a monomer, for example styrene, then serves as the solvent for DMPMI.

The suspension or emulsion polymerization is in general carried out in an aqueous medium. The monomers are usually emulsified here in the presence of a surface-active agent. Suitable agents are, for example, sodium-stearate, potassium lauryl sulfate, sodium dodecyl sulfate, sodium oleate, sodium alkylnaphthalenesulfonates and potassium alkylnaphthalenesufonates, pyridine derivatives or quaternary ammonium salts.

In a preferred preparation procedure for modified ABS polymers by emulsion polymerization, a butadiene copolymer latex is first prepared or taken as initial charge and a grafting reaction is then carried out by polymerization with a styrene/acrylonitrile/DMPMI monomer mixture. To obtain ABS powder from the polymer latex, acids, for example HCl, acetic acid or sulfuric acid, and/or electrolytes, for example LiCl, $MgSO_4$ or $CaCl_2$, can be added in small amounts to assist the precipitation. Suitable precipitating agents for this are, for example, alcohols, such as methanol, ethanol or propanol, or hydrocarbons, such as hexane.

In a preferred variant of bulk polymerization, for example for the preparation of modified ABS polymers, a suitable rubber substrate is first dissolved in the monomer mixture and polymerization is then carried out. Suitable rubber substrates are, for example, SAN, acrylonitrile rubber (ANR) or SBR, and silicone rubber, polyurethane rubber, bromobutyl rubber, ethylene/propylene rubber, epichlorohydrin rubber, polysulfide rubber, chlorosulfonepolyethylene, ethylene/vinyl acetate rubber, fluorinated rubber, polynorbornene rubber and polyphosphazene rubber.

The modified styrene copolymers and vinyl chloride copolymers prepared according to the invention are primarily obtained as powders and can then be processed to granules. They are distinguished by a higher glass transition temperature compared with the prior art, and therefore a higher heat distortion point and a low intrinsic coloration, which is manifested by a low yellowness index. For this reason, they are used for production of technical components of plastic. Technical components of plastic are used, for example, in electrical domestic appliances, for example for protection of electric motors or for thermal insulation, and for fittings and the like.

EXAMPLES 1–7

An ANR latex (Hycar/562, BF Goodrich) which comprises 67% butadiene and 33% acrylonitrile (AN), the solids content in water being 41%, was used for the experiments. 18.1 g of ANR latex, 10 g of styrene (ST) and 7.5 g of AN were employed. Equimolar amounts of AN and ST were replaced by 5, 10 or 20 mol % of DMPMI or phenylmaleimide (PMI), which was used as the comparison substance, in Experiments 2–7. For these experiments, DMPMI or PMI were first dissolved in AN, ST and ANR at 60° C. over a period of 15–30 minutes, sodium dodecyl sulfate (0.2% in 130 ml of $H_2O$) was added as an emulsifier and, after the monomers had dissolved completely, 4,4'-azobis(4-cyanovaleric acid) (0.5 mol %, based on the amount of monomer) was added as an initiator. The polymerization started at 60° C. The temperature was increased slowly to 75° C. over a period of 3 hours and kept at this level for a further 3 hours. The emulsion was then precipitated in 500 ml of methanol, 3 ml of 10% LiCl solution and 1.5 ml of concentrated hydrochloric acid being added in order to achieve a more compact precipitate. After filtration, the polymer was washed first with distilled water and then with methanol and dried.

The results are summarized in Table 1.

EXAMPLES 8–14

An SBR latex (Good-Rite 2570×59, BF Goodrich) which comprises 51% butadiene, 46% styrene and 3% acrylic acid ester, the solids content in water being 52%, was used for the experiments. 18.9 g of SBR latex, 5.5 g of ST and 10 g of AN were employed.

In Experiments 9–14, equimolar amounts of AN and ST were replaced by 5, 10 or 20% of DMPMI or PMI, which again was used as the comparison substance.

The polymerization was carried out analogously to Examples 1–7, and the results are shown in Table 2.

EXAMPLES 15–17

8 g of DMPMI (8% by weight) or 8 g of PMI (8% by weight) were copolymerized with 92 g of vinyl chloride (VCM) in an aqueous dispersion of 120 g of water, with 0.1 g of hydroxyethylcellulose as the dispersing agent, in the presence of 0.05 g of azodiisobutyronitrile as the initiator at 64° C. The precipitate thereby formed was filtered off, washed and then dried. For comparison, VCM was polymerized without an additional monomer.

The samples prepared according to Examples 1–17 were pressed to sheets and investigated in respect of their glass transition temperature (Tg) in a differential scanning calorimeter and in respect of their intrinsic coloration by means of the yellowness index (Y), and the results are shown in Table 3.

TABLE 1

| Ex. | ST g | AN g | PMI g | PMI mol % | DMPMI g | DMPMI mol % | Polymer g | Polymer conv. % |
|---|---|---|---|---|---|---|---|---|
| 1 | 10.5 | 7.5 | — | — | — | — | 22.3 | 84 |
| 2 | 9.7 | 7.3 | 2.0 | 5 | — | — | 23.7 | 85 |
| 3 | 9.5 | 7.1 | 4.1 | 10 | — | — | 25.8 | 89 |
| 4 | 9.0 | 6.8 | 8.2 | 20 | — | — | 28.3 | 87 |
| 5 | 9.7 | 7.3 | — | — | 2.4 | 5 | 24.3 | 86 |
| 6 | 9.5 | 7.1 | — | — | 4.8 | 10 | 25.9 | 86 |
| 7 | 9.0 | 6.8 | — | — | 9.6 | 20 | 28.1 | 81 | conv. % = percentage conversion

TABLE 2

| Ex. | ST g | AN g | PMI g | PMI mol % | DMPMI g | DMPMI mol % | Polymer g | Polymer conv. % |
|---|---|---|---|---|---|---|---|---|
| 8 | 5.5 | 10.0 | — | — | — | — | 23.1 | 86 |
| 9 | 5.3 | 9.7 | 2.1 | 5 | — | — | 24.7 | 87 |
| 10 | 5.2 | 9.5 | 4.2 | 10 | — | — | 24.4 | 77 |
| 11 | 4.9 | 9.5 | 8.4 | 20 | — | — | 29.3 | 87 |
| 12 | 5.3 | 9.7 | — | — | 2.4 | 5 | 24.3 | 83 |
| 13 | 5.2 | 9.5 | — | — | 4.8 | 10 | 25.9 | 86 |
| 14 | 4.9 | 9.0 | — | — | 9.6 | 20 | 29.5 | 83 | conv. % = percentage conversion

TABLE 3

| Example | PMI/ DMPMI | Latex/ Monomer | Tg (°C.) | Y |
|---|---|---|---|---|
| 1 | — | ANR/ST,AN | 110 | 2 |
| 2 | PMI | ANR/ST,AN | 112 | 5 |

TABLE 3-continued

| Example | PMI/ DMPMI | Latex/ Monomer | Tg (°C.) | Y |
|---|---|---|---|---|
| 3 | PMI | ANR/ST,AN | 113 | 10 |
| 4 | PMI | ANR/ST,AN | 115 | 20 |
| 5 | DMPMI | ANR/ST,AN | 115 | 3 |
| 6 | DMPMI | ANR/ST,AN | 140 | 4 |
| 7 | DMPMI | ANR/ST,AN | 165 | 5 |
| 8 | — | SBR/ST,AN | 110 | 6 |
| 9 | PMI | SBR/ST,AN | 115 | 9 |
| 10 | PMI | SBR/ST,AN | 120 | 12 |
| 11 | PMI | SBR/ST,AN | 130 | 25 |
| 12 | DMPMI | SBR/ST,AN | 140 | 5 |
| 13 | DMPMI | SBR/ST,AN | 160 | 7 |
| 14 | DMPMI | SBR/ST,AN | 225 | 9 |
| 15 | — | —/VCM | 70 | 0 |
| 16 | DMPMI | —/VCM | 89 | 1 |
| 17 | PMI | —/VCM | 82 | 4 |

What we claim is:

1. Styrene copolymers comprising 10–70% by weight of 2,6-dimethylphenylmaleimide and show, in regard to styrene copolymers without 2,6-dimethylphenylmaleimide, increased glass transition temperature and low intrinsic coloration.

2. Styrene copolymers according to claim 1 containing in addition to 2,6-dimethylphenylmaleimide and styrene, at least 1 copolymerizable monomer selected from the group consisting of dienes and acrylates.

3. Styrene copolymers according to claim 1, comprising 2,6-dimethylphenylmaleimide, styrene, acrylonitrile and butadiene.

4. Process for the preparation of styrene copolymers which comprises polymerizing monomers wherein said monomers are copolymerized with 2,6-dimethylphenylmaleimide.

5. Styrene copolymers according to claim 2 containing, in addition to dimethyl phenylmaleimide and styrene, at least two copolymerizable monomers selected from the group consisting of dienes and acrylates.

* * * * *